United States Patent [19]

Luttmer

[11] Patent Number: 5,113,486
[45] Date of Patent: May 12, 1992

[54] METHOD AND APPARATUS FOR REPRODUCING IMAGE INFORMATION IN VECTOR FORM ONTO A RASTER PATTERN OF PIXELS

[75] Inventor: Maurice L. M. Luttmer, Venlo, Netherlands

[73] Assignee: Oce-Nederland B.V., Netherlands

[21] Appl. No.: 547,601

[22] Filed: Jul. 2, 1990

[30] Foreign Application Priority Data

Jul. 3, 1989 [NL] Netherlands ............... 8901684

[51] Int. Cl.$^5$ .......................................... G06K 15/00
[52] U.S. Cl. ................................. 395/100; 395/141; 395/101
[58] Field of Search ............... 364/518, 519, 510, 521, 364/522; 346/154; 358/80, 79, 296, 298

[56] References Cited

U.S. PATENT DOCUMENTS 4,996,653  2/1991  Butler et al. ................ 364/518
5,016,195  5/1991  Worp ........................... 364/519

OTHER PUBLICATIONS

Modified Aloyrithm by Brandon, FBM Tech. Dis. Bulletin, vol. 20 No. 4 Sep. 1977 Digital Formats for Typefaces by Karon.

Primary Examiner—Arthur G. Evans
Attorney, Agent, or Firm—Reed Smith Shaw & McClay

[57] ABSTRACT

Boundaries between colored and uncolored image parts are reproduced on a pixel raster by determining a binary value ("colored" or "uncolored"), proceeding along a boundary, for adjoining pixels intersected by said boundary, said value being determined on the basis of the situation of said pixel with respect to the boundary and a carried-forward correction value. On the basis of the situation of said pixel with respect to the boundary a fractional value is calculated which is then rounded off to a binary pixel value. The rounding-off error made in such cases is processed using a prevention function for preventing allocating such binary values to the boundary pixels that visible bulges are formed on the boundary and is then carried-forward to the next pixel and included in the fractional value thereof. Instances of such prevention functions are described. This procedure gives a better reproduction of lines extending obliquely over the pixel raster.

18 Claims, 3 Drawing Sheets

IFW = INDIVIDUAL FRACTIONAL VALUE
CFW = CUMULATIVE FRACTIONAL VALUE
BPW = BINARY PIXEL VALUE
AF = ROUNDING-OFF ERROR
AO = INDICATING AND FILLING UNIT
M = MEMORY

METHOD AND APPARATUS FOR REPRODUCING IMAGE INFORMATION IN VECTOR FORM ONTO A RASTER PATTERN OF PIXELS

FIELD OF THE INVENTION

The invention relates to a method and apparatus for reproducing image information in vector form onto a raster pattern of binary pixels, and, in particular, for reproducing boundaries between colored and uncolored image areas onto said raster pattern.

BACKGROUND OF THE INVENTION

Methods of reproducing image information in vector form onto a raster pattern of binary pixels are known. They include allocating binary values to the pixels dependent on the position of said pixels with respect to colored and uncolored image areas contained in the image information. See, for example, U.S. Pat. No. 4,593,278.

With the method disclosed therein, image information in vector form supplied by a host processor is rendered suitable for processing by a printer which produces images by successively printing rows of pixels (with values 1 or 0) in consecutive scan lines situated one beneath the other.

The pixel pattern with which this printer works is a square raster in which the pixels occupy fixed positions on the raster points. Lines and boundaries of image parts which extend at an angle other than a right angle to the main directions of the raster are reproduced as follows by the known method: following the scanning sequence of the printer a check is continually made whether a boundary between a first image part and a second image part is approached and, when reached, the last pixel still completely belonging to the first image part is printed in the color (black or white) of that image part, whereafter the next pixel, which is thus intersected by the boundary, is printed in the color of the second image part. Thus a boundary situated obliquely over the pixel raster acquires a step-like configuration, this being visible particularly at small angles between the boundary and the raster direction, and having an adverse effect on the image quality.

Accordingly, it is an object of the invention to provide a method with which, despite the use of a pixel raster of fixed positions, image part boundaries extending obliquely over the raster can be reproduced with greatly reduced step formation.

SUMMARY OF THE INVENTION

Generally, the present invention provides a method in which pixels intersected by a boundary line between image areas are processed successively along the boundary line by allocating to each pixel a binary value in accordance with the sum of the ratio of the parts into which that pixel is divided by the boundary line and a correction value calculated from the error made by allocating a binary value to the previously processed pixel. The correction value is calculated by processing said error made by allocating a binary value to the previously processed pixel with a prevention function for preventing allocating such binary values to pixels that those pixels form bulges on the boundary of a reproduced image area that are separated from each other by more than a predetermined number of pixels.

Thus going along the boundary line with this method a check is continually made to determine the extent to which a boundary pixel belongs to each of the two associated image parts and said pixel is allocated to one of the two image parts on the basis of one or other criterion. Such allocation is effected by allocating to that pixel the binary value applicable to that image part. The error occurring in these circumstances—because the binary value can only be 1 or 0—is carried forward to the next boundary pixel and plays a part in the allocation of a binary value thereto. Thus, the method has the character of a rounding-off error propagation along the boundary between image parts. Single pixels projecting outwardly from the boundary line, thus, form at specific places. In laser printers which use a light spot overlapping several pixels, these pixels however appear not to be visible as separate pixels on the print, but simply change the configuration of the boundary line between image parts to some extent.

This effect is, however, only attained if the pixels projecting outwardly are not too far apart, otherwise the light spot is no longer able to "smooth out" these pixels. In that case, these pixels become visible as bulges on the boundary of the image area, ruining the desired effect. This applies for both pixels projecting from a colored image area and pixels projecting from an uncolored image area.

It has been found that outwardly projecting pixels can be prevented from being placed too far apart by processing the propagated error with a so-called prevention function, of which several embodiments are provided herein.

It should be noted that the application of separate pixels projecting from a boundary line in order to alter the configuration thereof is known per se in the graphic industry under the name "halfbitting". For example, see P. Karow: "Digital Formats for Typefaces", chapter 7.2 (Manual corrections), ISBN 3-926515-01-5. Here, however, there is no mention of a systematic compensation of step formation as a result of discretization errors, but of cosmetic adaptation of a character representation for embellishment. In this procedure each extra pixel is applied separately and for each extra pixel the effect is continually checked by reference to a proof print.

Also, reproducing a line onto a raster pattern using error propagation is disclosed in IBM Technical Disclosure Bulletin, Vol. 20, No. 4, September 1977, pp. 1578-1580; M. Brandon: "Modified algorithm for raster crt display". The described algorithm selects each time while it steps along the raster axis of the pixel raster that makes the smallest angle with the line to be reproduced the pixel that is nearest to a modified position of the line. The modified position is calculated by adding the positional error made by selecting the previous pixel to the actual position of the line.

This algorithm is essentially a plotting algorithm for plotting lines of infinitesimal thickness with pixels having a fixed diameter, whereas the present invention concerns a filling algorithm for filling an image area by assigning values to the pixels in such a way that the boundary line of the body formed by the pixels conforms to the boundary line of the image area as much as possible. Moreover, the Brandon algorithm does not comprise a prevention function as used in the present invention and, therefore, gives poor results for lines that are nearly parallel to one of the raster axes.

In one embodiment of the method invention, the prevention function is given by $f(err) = [err]n$, wherein err is the error made by allocating a binary value to the previously processed pixel (expressed as a part of a pixel), [x]n means rounding off x to a whole multiple of 1/n, and n is a predetermined integer>1.

The effect of this prevention function is that pixels projecting from a boundary line are not situated further apart than n pixels. This applies for both pixels projecting from a colored image area and from an uncolored image area. This embodiment gives a very smooth approximation of oblique image area boundaries when an optimal value for n with regard to the properties of the printing system is chosen.

According to another embodiment, the prevention function is given by:

$$f(\text{err}) = \begin{cases} 0 & \text{if } |\text{err}| < 1/n \\ \text{err} & \text{if } |\text{err}| \geq 1/n \end{cases},$$

wherein err is the error made by allocating a binary value to the previously processed pixel (expressed as a part of a pixel) and n is a predetermined integer>1.

This embodiment gives slightly less smooth results than the first embodiment, but it is faster.

According to a third embodiment, the prevention function is given by:

$$f(\text{err}) = \begin{cases} 0 & \text{when processing every } (n-1)\text{th pixel} \\ \text{err} & \text{otherwise} \end{cases},$$

wherein err is the error made by allocating a binary value to the previously processed pixel (expressed as a part of a pixel) and n is a predetermined integer>2.

This also gives a fast algorithm.

An apparatus for carrying out the method according to the invention, comprises a raster generator for allocating binary values to the pixels of a raster pattern dependent upon the position of said pixels with respect to colored and uncolored image areas contained in the image information. The raster generator is provided with (1) means for indicating successive adjoining pixels intersected by a boundary line between image areas; (2) means for allocating to an indicated pixel a binary value in accordance with the sum of the ratio of the parts into which that pixel is divided by the boundary line and a correction value; (3) an error calculating means for calculating the error made by allocating a binary value to a pixel and (4) means for calculating said correction value by processing the error made by allocating a binary value to the previously indicated pixel with a prevention function for preventing allocating binary values to pixels that would cause those pixels to form bulges on the boundary of a reproduced image area that are separated from each other by more than a predetermined number of pixels.

Other features and advantages of the method and of the apparatus according to the invention will be apparent from the following description with reference to the accompanying drawings in which like references denote like parts.

PRESENTLY PREFERRED EMBODIMENTS

Figure 1:
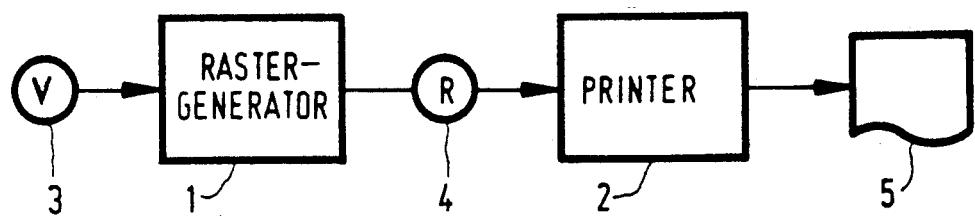
FIG. 1 is a diagram of an apparatus for reproducing image information.

FIG. 1 is a general diagram of an apparatus for printing digital image information 3 in vector form from a source (not shown), e.g. a host computer, on to an image support. The apparatus comprises a raster generator 1 which converts the image information in vector form 3 to image information in raster form 4 and transmits it to a laser printer 2 which makes a print thereof on an image support 5. The image information in raster form 4 has the character of a square raster of image points (pixels) which are either colored or uncolored.

Figure 2:
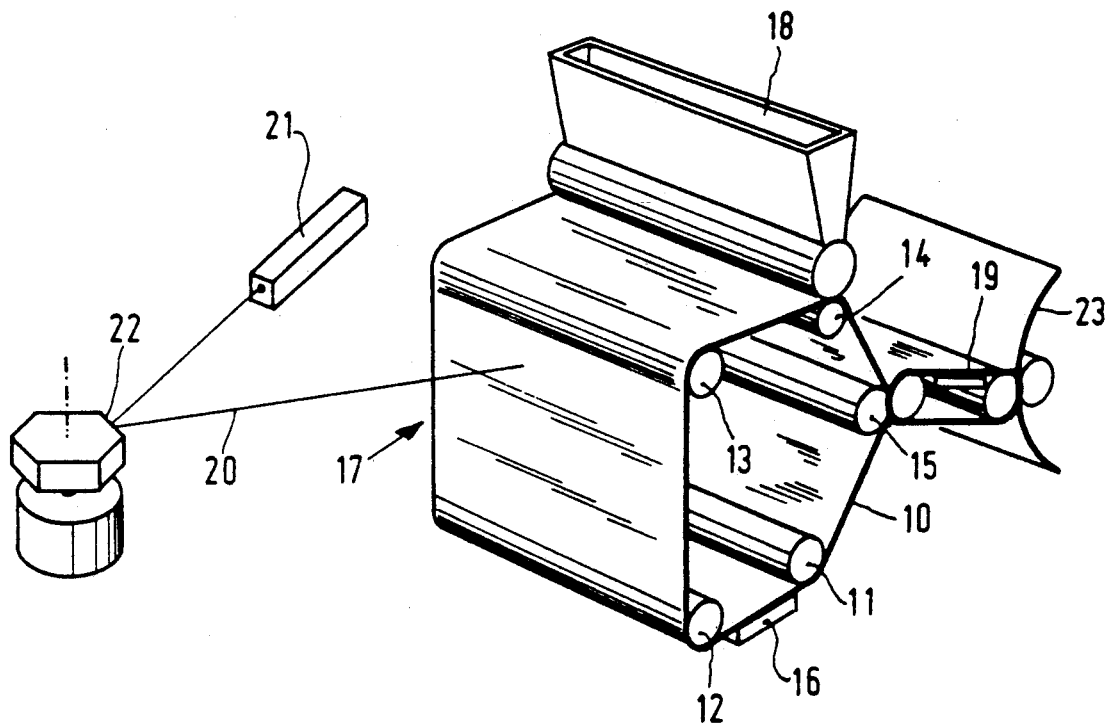
FIG. 2 is a diagram showing the process part of a laser printer for use in this apparatus.

FIG. 2 is a diagram showing the process part of the laser printer 2 by reference to which the operation will be explained. A belt 10 of photoconductive material is trained about a number of rollers 11, 12, 13, 14, 15 and is transported about them past a number of process stations 16, 17, 18, 19. In the charging station 16 the belt 10 is given a surface charge which is then selectively exposed away in the exposure station 17 by exposing the belt surface by means of a beam of light 20 in accordance with the raster pattern in the image information 4. This is effected by moving a beam of light 20 from a laser 21 over the belt surface by means of a rotating mirror 22 in a direction transverse to the direction of transport of the belt 10 and at the same time modulating the light.

A raster pattern of charged and discharged locations thus forms on the belt surface. This pattern is then developed in the developing station 18 with colored powder, called toner, the charged locations being provided with toner. This process is generally known from electrophotography and will not be described in detail here. The toner image formed on the belt 10 is then transferred in the transfer station 19 to an image support 23, thus completing the printing process.

Figure 3:
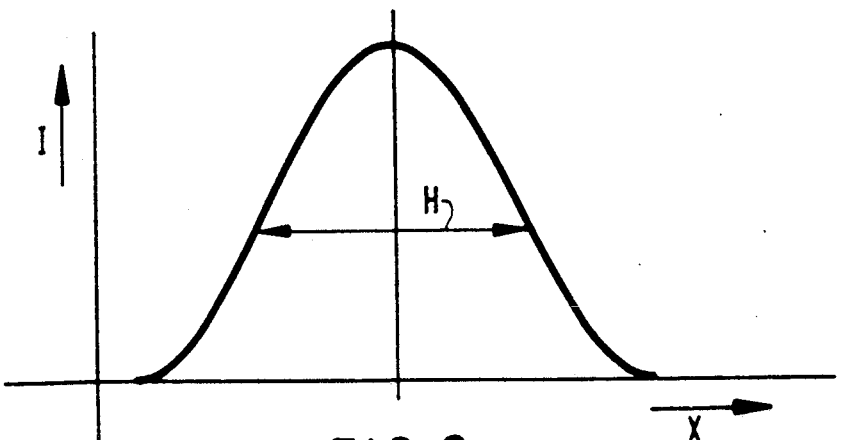
FIG. 3 shows the intensity distribution of the light spot on the photoconductive belt in the laser printer.

The intensity distribution of the light spot on the surface of the photoconductive belt 10 is shown in FIG. 3. The intensity I has a substantially Gaussian curve against the location x, with a half value width H larger than the size of one pixel. Consequently, the tracks of the beam of light on the belt surface overlap one another. The advantage of this is that small transverse deviations in the tracks do not immediately result in unexposed zones, which would be visible on the print in the form of colored stripes, but on the other hand, in the preparation of the image information in raster form account must be taken of the "nibbling away" of colored image parts because the light spot extends to outside the pixel.

Figure 4A:
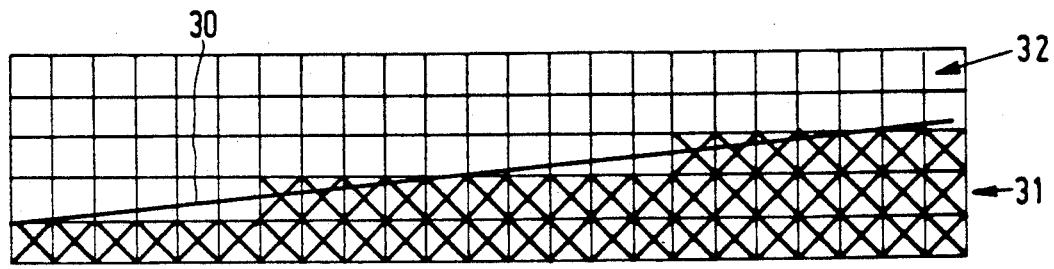
FIG. 4a shows a boundary between a colored image part and an uncolored image part superimposed on a pixel raster.

FIG. 4a shows a raster pattern of pixels with superimposed thereon an oblique image boundary 30 between a colored image part 31 and an uncolored image part 32 (neither shown completely). In this example the image boundary has a gradient percentage of 10, i.e., it is offset 1 vertical pixel for each 10 horizontal pixels. The image boundary passes through a number of pixels which are thus partially situated within the colored image part and partially within the uncolored image part. The part of a pixel which is situated within the colored image part is hereinafter referred to as the "individual fractional value" of that pixel.

Figure 4B:
FIG. 4b shows a print from a laser printer of the image boundary from FIG. 4a in accordance with a conventional technique.

A frequently used method of imaging the image boundary on the pixel raster is to carry out a continual check whether a pixel is situated with more than half of its area within the colored image part (i.e., whether the individual fractional value of that pixel is greater than 0.5) and if so giving said pixel a binary value corresponding to the colored state, and in the other case giving the pixel the other binary value corresponding to the uncolored state. This would give a result of the kind shown in FIG. 4a, in which the colored pixels are indicated by a cross. The resulting print is shown in FIG. 4b. A step-shaped configuration is clearly apparent. This effect is readily visible even in the case of high resolution laser printers.

Figure 5A:
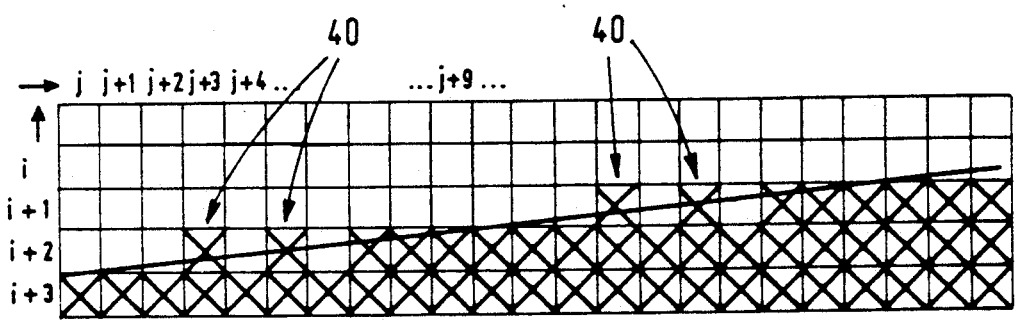
FIG. 5a shows the same image boundary superimposed on the pixel raster.

An improved way of imaging the image boundary 30 on the pixel raster is shown in FIG. 5a. The image boundary is followed from left to right pixel by pixel. This is readily achieved because the configuration of the image boundary in vector form is known. For this example the pixel positions are denoted by i, i+1, i+2, and so on in the vertical direction, and j, j+1, j+2 and so on in the horizontal direction. The first pixel to be evaluated is at position i+2, j. Here again the criterion is that at least half of the pixel area must be situated within a colored image part if it is to be colored, but the rounding-off error which is discarded in the above-discussed method is now carried forward to the next pixel.

The pixel on position i+2, j is situated as to a portion of 0.05 within the colored image part, (the individual fractional value thereof is 0.05) and consequently receives a binary value equivalent to the uncolored state. This, however, involves a rounding-off error equal to 0.05 and this rounding-off error is carried forward to the next pixel at position i+2, j+1. This latter pixel is situated as to a portion of 0.15 within the colored image part, but before the rounding-off criterion is applied the rounding-off error (the "carry forward value") carried forward from the previous pixel is summated in respect of the pixel portion situated within the colored image part, so that the value for evaluation (the "cumulative fractional value" of that pixel) is now 0.2. This value is still less than ½ so that this pixel also remains uncolored. The rounding-off error of 0.2 is again carried forward to the next pixel, at position i+2, j+2. This pixel is situated as to a portion of 0.25 within the colored image part. The carried forward rounding-off error of 0.2 is added here, resulting in a value of 0.45 for evaluation. This is again less than ½, and hence this pixel also remains uncolored. In doing this a rounding-off error of 0.45 is incurred, and this is again carried forward to the next pixel, at position i+2, j+3. This pixel is situated as to a portion of 0.35 within the colored image part. The carried-forward rounding-off error of 0.45 is added here, resulting in a value of 0.8 for evaluation. This value is greater than ½ and consequently the intended pixel is colored. This time there is a rounding-off error of $-0.2$, so that an evaluation value of 0.25 applies for the next pixel at position i+2, j+4, which is situated as to a portion of 0.45 within the colored image part. This value does not satisfy the criterion so that the pixel is not colored. The result of this procedure will now be clear. The resulting pixel filling-in will be apparent from FIG. 5a.

When the pixel at position i+2, j+9 is reached all the following pixels of the row i+2 are colored, because they are situated completely within the colored image part, and the evaluation procedure continues with row i+1, taking into account any rounding-off error saved at the pixel on position i+2, j+9 (although for the case discussed as an example here this error is=0).

Figure 5B:
FIG. 5b shows a print from a laser printer of the image boundary from FIG. 5a in accordance with an improved technique.

FIG. 5b shows the result of the pixel filling-in as described hereafter printing by the laser printer. The pixels 40 projecting from the image boundary are not separately visible because they have been partially erased by the laser light spot overlapping some pixels. Their presence, however, leads to a much more gradual configuration of the image boundary on the print.

The pixels 40 projecting from an image boundary must not be too far apart because otherwise they would still be separately visible. In a practical case in which the laser light spot had an average half-value width of 80 micrometers, the required effect appeared to occur with pixels of a size 50×50 micrometers only when the colored pixels were separated by not more than two uncolored pixels.

To achieve this, the rounding-off error to be carried forward is processed with a prevention function f. Particularly in the case of image boundaries which form a very small angle with a main direction of the pixel raster this processing is very important.

In a first embodiment of the method according to the invention the function f is a rounding-off to part G of a pixel or whole multiples thereof. The maximum distance between two projecting pixels is determined by the value of G. If G=½, the maximum distance is two pixels, i.e., there can be a maximum of one uncolored pixel situated between two colored projecting pixels, while in the case of G=⅓ the maximum distance is three pixels. Generally, if G equals 1/n (n being an integer>1), the maximum distance is n pixels, so the maximum number of pixels separating two projecting (colored or uncolored) pixels is n−1.

In a second embodiment, the function f reduces the rounding-off error to 0 if the error is smaller than a part G of a pixel. If the absolute value of the error is greater than G, it is returned unaltered by f. The maximum distance attained using this embodiment is n pixels when G equals 1/n (where n is an integer greater than 1).

In a third embodiment, the function f simply reduces the rounding-off error to 0 every time it processes an (n−1)th boundary pixel (where n is an integer>2). This results in a maximum distance of n pixels.

Table I (Annex) shows the results of using the three embodiments of the method according to the invention for n=3, when processing an image boundary similar to the one shown in FIGS. 4a and 5a, but having a gradient percentage of 40.

The first column ("nr") states the number of the horizontal raster position being processed (from 1 to 41) and the second column ("i.f.v.") contains the individual fractional value of the boundary pixel on the position in the first column, i.e., the part of that pixel covered by the image area below the boundary line.

The third and fourth columns show the results of processing the boundary line using error propagation without using the prevention function f ("simple carry-forward"). The third column ("pixel") identifies the pixels allocated the color of the image area below the boundary line with an x. Pixels allocated the color of the image area above the boundary line are indicated by —. The fourth column ("carry-f") shows the rounding-off error actually carried forward to the next pixel.

From the third column it can be seen that the pixels nr. 7, 32 and 40 are separated by more than two pixels of a different color and therefore will show up on the printed result as bulges on the boundary line. In the case of a boundary line having a greater gradient percentage the number of isolated pixels visible as bulges on the boundary line would be still greater.

The results of processing the boundary line with the method according to the invention, that is using the prevention function f, are given in the 5th and 6th, the 7th and 8th and the 9th and 10th columns for the first, second and third embodiments, respectively. Mutatis mutandis, the columns show the same information as the third and fourth columns. It follows clearly from these columns, that there are no pixels separated too much to form visible bulges on the boundary line. Of course, the number n should be chosen to fit the properties of the print system (that is, the dot overlap used) optimally.

It should be noted that the procedure described produces particularly good results if the angle between the image boundary 30 and the processing direction (which in FIG. 5 is formed by the horizontal in the direction, j, j+1, etc.) is between 0° and 45°. The processing algorithm should preferably be so adapted that the processing extends in the direction imposed thereby.

Figure 6:
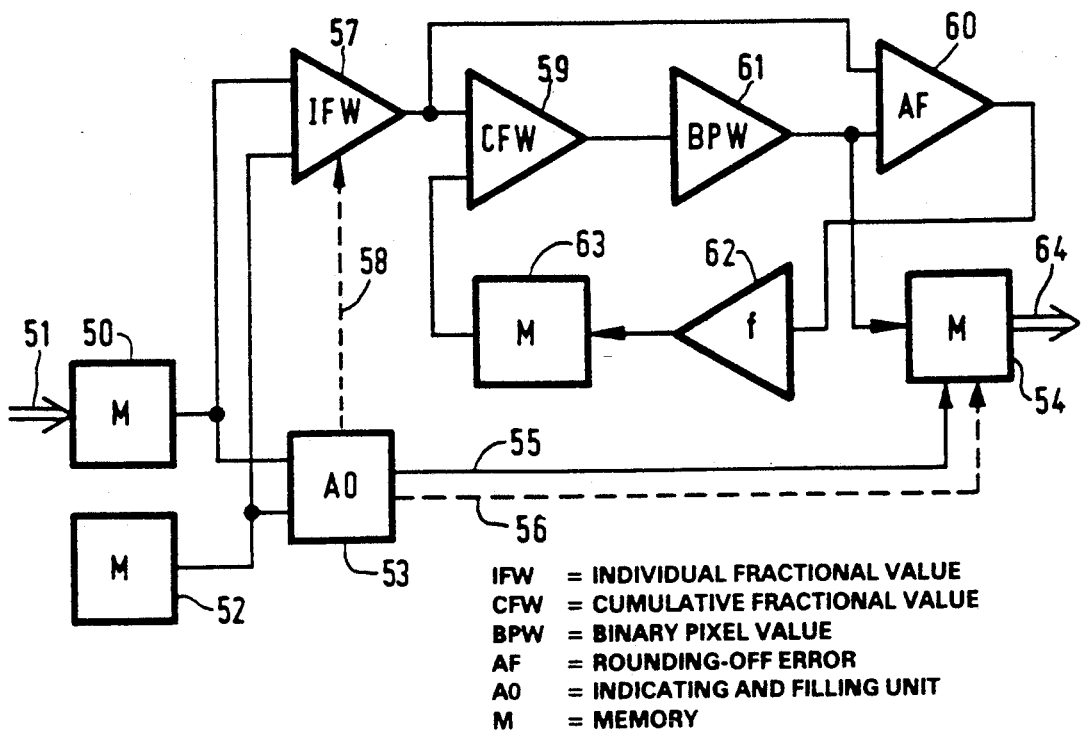
FIG. 6 is a diagram of a raster generator for use in an apparatus according to the invention.

FIG. 6 is a diagram of a raster generator for use in an apparatus according to the invention. The apparatus itself otherwise complies with the description of FIG. 1. A memory 50 connected via a bus 51 to a host computer (not shown), and a memory 52 are both connected to an indicating and filling unit 53 in turn connected to a bit map memory 54 via a data bus 55 and an address bus 56. Unit 53 is also connected to a module IFW (57) via an address bus 58. Module IFW (57) is also connected to the memories 50 and 52 and also at its output to a module CFW (59) and via the same connection to a module AF (60). The input of module CFW (59) is connected to a buffer memory 63 and its output is connected to a module BPW (61). The output of the latter module is connected to module AF (60) and via the same connection to the bit map memory 54. The output of module AF (60) is connected to a module f (62), which in turn has an output to the buffer memory 63. Finally, the bit map memory 54 is provided with an output bus 64 for connection to a laser printer (not shown).

The operation of this raster generator is as follows. The memory 50 is loaded by the host computer via the bus 51 with image data in vector form, i.e., the formulae which describe the image boundaries, and data relating to the binary values ("colored" or "uncolored") of the areas enclosed by the image boundaries. The memory 52 is previously loaded with data relating to the raster pattern on which the image data are to be reproduced for the printer.

The indicating and filling unit 53 then analyzes the image boundaries contained in the image data and determines the pixels which are intersected by the image boundaries. It transmits this information in sequence via the address bus 58 to the module IFW (57), which always determines the individual fractional value of an indicated pixel on the basis of the data in the memories 50 and 52. This value then passes to the module CFW (59), which calculates the cumulative fractional value by summing any carry-forward value present in the buffer memory 63 with the individual fractional value.

The module CFW (59) thus feeds the cumulative fractional value calculated in this way to the module BPW (61), which on the basis of a predetermined criterion, e.g., "is the cumulative fractional value greater or less than ½?", allocates a binary value to the intended pixel. The allocated binary value is stored in the bit map memory 54 at a location indicated by the unit 53 via the address bus 56, such location being related to the location of the intended pixel in the print to be made by the laser printer.

The allocated binary value is also transmitted by module BPW (61) to module AF (60), which compares it with the individual fractional value fed by the module IFW (57) and determines the rounding-off error made. The module AF (60) transmits this rounding-off error to the module f (62), which rounds it off to ⅓ pixel or any other value as described in the foregoing, or processes it in another way according to the second or third embodiment described above, and stores this processed rounding-off error as a carry-forward value in the buffer memory 63 for use by the module CFW (59) for the following pixel. In the above-described manner all the pixels intersected by a boundary line between two image parts are given a binary value ("colored" or "uncolored"). The remaining pixels which are thus situated completely in a colored or uncolored image part are then given a binary value by the unit 53 on the basis of the data in the memories 50 and 52 and are placed, by means of the data bus 55 and the address bus 56, in the bit map memory 54 at locations related to their locations in the print to be made by the laser printer.

Figure 7:
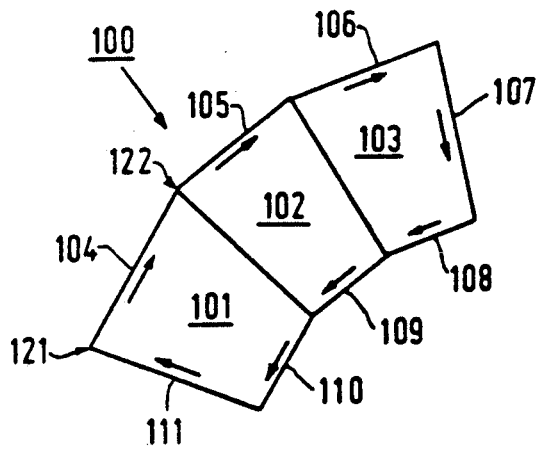
FIG. 7 shows an image part built up from portions.

If the end point of a boundary line is reached in reproducing an image boundary on the pixel raster and a new boundary line is started, the carry-forward value stored in the buffer memory 63 can be discarded (if the boundary line to be processed is not related to the one just completed), but it can also be taken over to the new boundary line to be processed. This may be particularly convenient for building up image parts from contiguous parts as shown in FIG. 7. This shows how a segment 100 of a circular belt is built up from a number of portions 101, 102, 103 surrounded by straight line parts. The raster generator passes through the image boundaries in the direction of the arrows starting at point 121. After the image boundary has been passed until point 122, the last carry-forward value thereof is taken over to the image boundary 105 and this also occurs at the transition of the image boundary 105 to the image boundary 106. On reaching the end of the image boundary 106, however, the carry-forward value is erased from the buffer memory because the next image boundary (107) to be processed has no relationship with the previous one. This also occurs on the transition to the image boundary 108, but the carry-forward value is again taken over at the transitions to the image boundaries 109 and 110. Image boundary 111 again starts with a clean buffer memory 63 and after processing thereof the entire segment is surrounded by pixels and is filled by the unit 53.

The bit map memory 54 now contains all the data for making a print by means of the laser printer. The latter can access these data via the output bus 64.

Although the invention has been described with reference to the example hereinbefore, it is not restricted thereto. The one skilled in the art will find alternative embodiments within the scope of the claims. Thus the invention, apart from being of use for a "white writing" laser printer as described here, can also be used for a "black writing" laser printer or even for any other printer which makes printed points which overlap various pixels. The invention is also applicable to screens and displays with dot overlap.

values to pixels that those pixels form bulges on the boundary of a reproduced image area that are separated from each other by more than a predetermined number of pixels.

2. A method according to claim 1, wherein said prevention function is given by f(err)=[err]n, wherein f is the prevention function;

err is said error made by allocating a binary value to the previously processed pixel (expressed as a part of a pixel);

[x]n means rounding off x to a whole multiple of 1/n (including 0); and n is a predetermined integer > 1.

3. A method according to claim 1, wherein said prevention function is given by:

$$f(\text{err}) = \begin{cases} 0 & \text{if } |\text{err}| < 1/n \\ \text{err} & \text{if } |\text{err}| >= 1/n \end{cases},$$

where f is the prevention function;

err is the error made by allocating a binary value to the previously processed pixel (expressed as a part of a pixel); and n is a predetermined integer > 1.

TABLE I
ANNEX

| nr | i.f.v. | simple pixel | simple carry-f | 1st embodiment pixel | 1st embodiment carry-f | 2nd embodiment pixel | 2nd embodiment carry-f | 3rd embodiment pixel | 3rd embodiment carry-f |
|---|---|---|---|---|---|---|---|---|---|
| 1 | 0.000 | — | 0.000 | — | 0.000 | — | 0.000 | — | 0.000 |
| 2 | 0.025 | — | 0.025 | — | 0.000 | — | 0.000 | — | 0.000 |
| 3 | 0.050 | — | 0.075 | — | 0.000 | — | 0.000 | — | 0.050 |
| 4 | 0.075 | — | 0.150 | — | 0.000 | — | 0.000 | — | 0.000 |
| 5 | 0.100 | — | 0.250 | — | 0.000 | — | 0.000 | — | 0.100 |
| 6 | 0.125 | — | 0.375 | — | 0.000 | — | 0.000 | — | 0.000 |
| 7 | 0.150 | x | −.475 | — | 0.000 | — | 0.000 | — | 0.150 |
| 8 | 0.175 | — | −.300 | — | 0.333 | — | 0.000 | — | 0.000 |
| 9 | 0.200 | — | −.100 | x | −.333 | — | 0.000 | — | 0.200 |
| 10 | 0.225 | — | 0.125 | — | 0.000 | — | 0.000 | — | 0.000 |
| 11 | 0.250 | — | 0.375 | — | 0.333 | — | 0.000 | — | 0.250 |
| 12 | 0.275 | x | −.350 | x | −.333 | — | 0.000 | x | 0.000 |
| 13 | 0.300 | — | −.050 | — | 0.000 | — | 0.000 | — | 0.300 |
| 14 | 0.325 | — | 0.275 | — | 0.333 | — | 0.000 | x | 0.000 |
| 15 | 0.350 | x | −.375 | x | −.333 | — | 0.350 | — | 0.350 |
| 16 | 0.375 | — | 0.000 | — | 0.000 | x | 0.000 | x | 0.000 |
| 17 | 0.400 | — | 0.400 | — | 0.333 | — | 0.400 | — | 0.400 |
| 18 | 0.425 | x | −.175 | x | −.333 | x | 0.000 | x | 0.000 |
| 19 | 0.450 | — | 0.275 | — | 0.000 | — | 0.450 | — | 0.450 |
| 20 | 0.475 | x | −.250 | — | 0.333 | x | 0.000 | x | 0.000 |
| 21 | 0.500 | — | 0.250 | x | −.333 | x | −.500 | x | −.500 |
| 22 | 0.525 | x | −.225 | — | 0.333 | — | 0.000 | — | 0.000 |
| 23 | 0.550 | — | 0.325 | x | 0.000 | x | −.450 | x | −.450 |
| 24 | 0.575 | x | −.100 | x | −.333 | — | 0.000 | — | 0.000 |
| 25 | 0.600 | x | −.500 | — | 0.333 | x | −.400 | x | −.400 |
| 26 | 0.625 | — | 0.125 | x | 0.000 | — | 0.000 | — | 0.000 |
| 27 | 0.650 | x | −.225 | x | −.333 | x | −.350 | x | −.350 |
| 28 | 0.675 | — | 0.450 | — | 0.333 | — | 0.000 | — | 0.000 |
| 29 | 0.700 | x | 0.150 | x | 0.000 | x | 0.000 | x | −.300 |
| 30 | 0.725 | x | −.125 | x | −.333 | x | 0.000 | — | 0.000 |
| 31 | 0.750 | x | −.375 | — | 0.333 | x | 0.000 | x | −.250 |
| 32 | 0.775 | — | 0.400 | x | 0.000 | x | 0.000 | x | 0.000 |
| 33 | 0.800 | x | 0.200 | x | −.333 | x | 0.000 | x | −.200 |
| 34 | 0.825 | x | 0.025 | — | 0.333 | x | 0.000 | x | 0.000 |
| 35 | 0.850 | x | −.125 | x | 0.333 | x | 0.000 | x | −.150 |
| 36 | 0.875 | x | −.250 | x | 0.333 | x | 0.000 | x | 0.000 |
| 37 | 0.900 | x | −.350 | x | 0.333 | x | 0.000 | x | −.100 |
| 38 | 0.925 | x | −.425 | x | 0.333 | x | 0.000 | x | 0.000 |
| 39 | 0.950 | x | −.475 | x | 0.333 | x | 0.000 | x | −.050 |
| 40 | 0.975 | — | 0.500 | x | 0.333 | x | 0.000 | x | 0.000 |
| 41 | 1.000 | x | 0.500 | x | 0.333 | x | 0.000 | x | −.000 |

What is claimed is:

1. A method of reproducing image information in vector form onto a raster pattern of binary pixels, comprising allocating binary values to the pixels dependent upon the position of said pixels with respect to colored and uncolored image areas contained in the image information, said method including successively processing pixels intersected by a boundary line between image areas along said following that boundary line, by allocating to each pixel a binary value in accordance with the sum of the ratio of the parts into which that pixel is divided by said boundary line and a correction value calculated from any error made by allocating a binary value to the previously processed pixel; said correction value being calculated by processing said error made by allocating a binary value to an immediate previously processed pixel with a prevention function for preventing allocating such binary 4. A method according to claim 1, wherein said prevention function is given by:

$$f(\text{err}) = \begin{cases} 0 & \text{when processing every } (n-1)\text{th pixel} \\ \text{err} & \text{otherwise} \end{cases},$$

where
- f is the prevention function;
- err is the error made by allocating a binary value to the previously processed pixel (expressed as a part of a pixel); and
- n is a predetermined integer $>2$.

5. A method according to claim 2 or 3, wherein n=2.

6. A method according to claim 2, 3 or 4, wherein n=3.

7. Apparatus for reproducing image information in vector form, comprising a raster generator for allocating binary values to the pixels of a raster pattern in dependence on the position of the said pixels with respect to colored and uncolored image areas contained in the image information, wherein the raster generator is provided with
- means for indicating successive adjoining pixels intersected by a boundary line between image areas;
- means for allocating to an indicated pixel a binary value in accordance with the sum of the ratio of the parts into which that pixel is divided by the boundary line and a correction value;
- means for calculating the error made by allocating a binary value to a pixel; and
- means for calculating a correction value by processing the error made by allocating a binary value to the previously indicated pixel with a prevention function for preventing allocating such binary values to pixels that those pixels form bulges on the boundary of a reproduced image area that are separated from each other by more than a predetermined number of pixels.

8. Apparatus according to claim 7, wherein the means for calculating a correction value comprise a prevention function module that upon input of a value returns that value rounded off to a whole multiple of 1/n (including zero) (wherein n is a predetermined integer$>1$).

9. Apparatus according to claim 7, wherein the means for calculating a correction value comprise a prevention function module that upon input of a value returns:
- that same value, if the absolute value of that value is greater than or equal to 1/n, and
- zero, if that value is less than 1/n wherein n is a predetermined integer 1.

10. Apparatus according to claim 7, wherein the means for calculating a correction value comprise a prevention function module that upon input of a value returns:
- zero, when processing every (n−1)th pixel,; and
- that same value, otherwise wherein n is a predetermined integer 2.

11. Apparatus according to claim 8 or 9, wherein n=2.

12. Apparatus according to claim 8, 9 or 10, wherein n=3.

13. Raster generator for converting image information in vector form into image information in raster form relating to a raster pattern of binary pixels by allocating binary values to the pixels of the raster pattern in dependence on the position of the said pixels with respect to colored and uncolored image areas contained in the image information, characterized by
- means for indicating successive adjoining pixels intersected by a boundary line between image area;
- means for allocating to an indicated pixel a binary value in accordance with the sum of the ratio of the parts into which that pixel is divided by the boundary line and a correction value;
- means for calculating the error made by allocating a binary value to a pixel; and
- means for calculating a correction value by processing the error made by allocating a binary value to the previously indicated pixel with a prevention function for preventing allocating such binary values to pixels that those pixels form bulges on the boundary of a reproduced image area that are separated from each other by more than a predetermined number of pixels.

14. Raster generator according to claim 13, wherein the means for calculating a correction value comprises a prevention function module that upon input of a value returns that value rounded off to a whole multiple of 1/n (including zero) (wherein n is a predetermined integer$>1$).

15. Raster generator according to claim 13, wherein the means for calculating a correction value comprise a prevention function module that upon input of a value returns:
- that same value, if the absolute value of that value is greater than or equal to 1/n, and
- zero, if that value is less than 1/n wherein n is a predetermined integer 1.

16. Raster generator according to claim 13, wherein the means for calculating a correction value comprise a prevention function module that upon input of a value returns:
- zero, when processing every (n−1)th pixel,; and
- that same value, otherwise wherein n is a predetermined integer 2.

17. Raster generator according to claim 14 or 15, wherein n=2.

18. Raster generator according to claim 14, 15 or 16, wherein n=3.

* * * * *

UNITED STATES PATENT AND TRADEMARK OFFICE
CERTIFICATE OF CORRECTION

PATENT NO. : 5,113,486                  Page 1 of 2
DATED       : May 12, 1992
INVENTOR(S) : Maurice L. M. Luttmer It is certified that error appears in the above-indentified patent and that said Letters Patent is hereby corrected as shown below:

Column 3, Line 18, the phrase "err if /err/ >= 1/n' should be --err if /err/ >= 1/n--.

Column 9, Claim 1, Line 58, the words "along said" should be taken out.

Column 10, Claim 3, Line 61 "err if /err/ >= 1/n' should be --err if /err/ >= 1/n--.

Column 11, Claim 9, Line 52, the phrase "wherein n is a predetermined integer 1" should be --wherein n is a predetermined integer > 1--.

Column 12, Claim 10, Line 3, the phrase "wherein n is a predetermined integer 2" should be --wherein n is a predetermined integer > 2--.

Column 12, Claim 13, Line 16, the word "area" should be --areas--.

Column 12, Claim 15, Line 44, the phrase "wherein n is a predetermined integer 1" should be --wherein n is a predetermined integer > 1--.

UNITED STATES PATENT AND TRADEMARK OFFICE
CERTIFICATE OF CORRECTION

PATENT NO. : 5,113,486
DATED : May 12, 1992
INVENTOR(S) : Maurice L.M. Luttmer

It is certified that error appears in the above-indentified patent and that said Letters Patent is hereby corrected as shown below:

Column 12, Claim 16, Line 51, the phrase "wherein n is a predetermined integer 2" should be --wherein n is a predetermined integer > 2--.

Signed and Sealed this

Second Day of November, 1993

Attest:

BRUCE LEHMAN

Attesting Officer     Commissioner of Patents and Trademarks